Jan. 27, 1970  A. A. BALLMAN ET AL  3,492,492

OPTICALLY ACTIVE DEVICE WITH OPTICAL ENHANCEMENT

Filed June 16, 1967  2 Sheets-Sheet 1

INVENTORS  A. A. BALLMAN
P. V. LENZO
E. G. SPENCER
BY
ATTORNEY

United States Patent Office 3,492,492
Patented Jan. 27, 1970

3,492,492
OPTICALLY ACTIVE DEVICE WITH OPTICAL ENHANCEMENT
Albert A. Ballman, Woodbridge, Pascal V. Lenzo, Warren Township, Somerset County, and Edward G. Spencer, Berkeley Heights, N.J., assignors to Bell Telephone Laboratories, Incorporated, Murray Hill, N.J., a corporation of New York
Filed June 16, 1967, Ser. No. 646,636
Int. Cl. H01j 39/12; G02f 1/18
U.S. Cl. 250—225                    23 Claims

ABSTRACT OF THE DISCLOSURE

A bismuth germanium oxide crystal is subjected to an electric field along a first crystal axis and optically probed by a monochromatic light source. A multichromatic light source is arranged to illuminate a portion of the crystal through which the monochromatic beam is transmitted for thereby altering the optical activity of the crystal. The electric field intensity can also be varied, in the presence of the multichromatic light, to change further the optical activity of the crystal. By combining the crystal with different arrangements of light polarization filters and light refracting members, different systems such as light-controlled light switching, modulating, and positioning are realized.

BACKGROUND OF THE INVENTION

Field of the invention

This invention relates to light modifying devices and it relates more particularly to such devices in which the output of one light source is employed to control directly predetermined transmission effects upon the output of another light source.

Description of the prior art

Several physical effects representing an interplay of electrical and optical factors are known in the prior art. One of these is the optical activity effect displayed by devices which are responsive to the transmission of plane-polarized light therethrough for rotating the plane of polarization of the light. Another effect is the electro-optic effect, and it is displayed by devices which are responsive to an applied electric field for changing the index of refraction of the device material without significantly affecting the orientation of the plane of polarization of light transmitted therethrough. A third effect is photo-conductivity, and devices displaying this effect respond to device illumination by altering their electrical conductivity.

Each of the aforementioned effects has been employed individually in various device applications, and some of the applications for different ones of the mentioned effects are light switches, light modulators, and light deflectors. In these applications the devices are generally subjected to a combination of electrical and optical control to produce either electrical or optical effects.

It is, however, one object of the present invention to utilize light from one light source to control the transmission of light supplied from another light source.

SUMMARY OF THE INVENTION

The stated object and other objects of the invention are realized in one illustrative embodiment in which a body of material, which is under the influence of an electric field, is probed by a first beam of light. A portion of the body transmitting such light beam is selectively illuminated by a second light beam to alter the transmission characteristics of the body for the first beam. The phenomenon resulting from the combination of the second light source on a body in the presence of an electric field is herein designated "photo-activity," or similar derivative forms of such term. The first beam provides a measure of the effect produced.

It is one feature of the invention that the material is optically active, and the first and second beams are monochromatic and multichromatic, respectively.

An additional feature of the invention is that either the intensity of the multichromatic light or the intensity of the electric field may be varied to change the optical activity of the body transmitting the monochromatic light beam.

Another feature is that a crystal of material in the cubic point group 23 is employed for the body of material transmitting the monochromatic light beam.

A further feature is that the body of material is combined with known refractive and filtering devices to implement light beam displacement functions.

A still further feature is that the body of material is combined with known polarization filtering devices to switch and modulate a light beam.

Yet another feature is that ferroelectric enchancement is employed to reduce the required intensity of the electric field.

DESCRIPTION OF THE DRAWING

A more complete understanding of the invention and its various features, objects, and advantages may be obtained from a consideration of the following detailed description in connection with the appended claims and the attached drawing in which:

DETAILED DESCRIPTION

Figure 1:
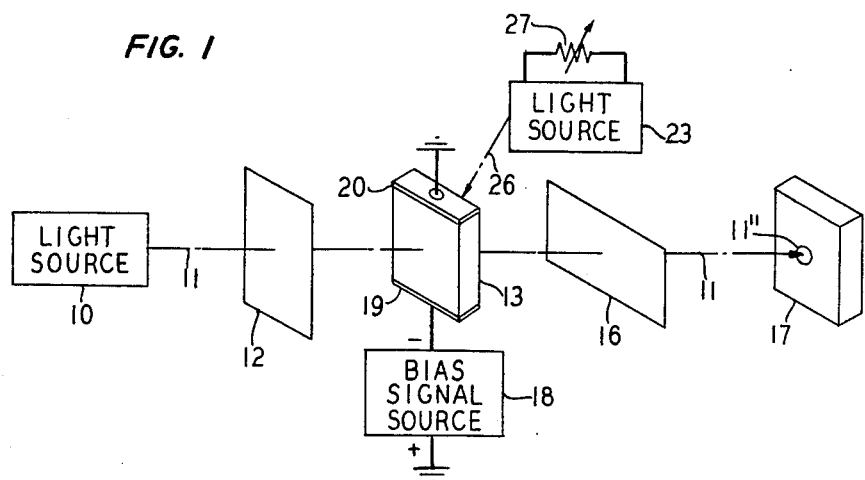
FIG. 1 is a simplified drawing of a light modifying system in accordance with the present invention.

In FIG. 1 the output of a light source 10 is directed in a beam 11, schematically represented by a broken-line arrow, through a polarizer 12, a body of photoactive material 13, and an analyzer 16 to a detector 17. In one embodiment of the invention the elements just described are assembled in a microscope arrangement in which the light source 10 is a tungsten lamp radiating through a red filter which passes light with a wavelength of approximately 6000 A. From the polarizer the light passes through the crystal 13 and the objective lens of the microscope, and it thereafter passes through the compensator and analyzer of the microscope system to an eyepiece or a projecting screen. However, the preferred embodiment takes the simplified form shown in FIG. 1 and to be hereinafter discussed.

Polarizer 12 and analyzer 16 are schematically represented as differently oriented rectangles to indicate light filtering devices for transmitting plane-polarized light with different polarization orientations. Detector 17 can be a projecting screen, or a photoconductive detector, or any other convenient light intensity indicating means. This, of course, includes a detector having an array of discrete, differently positioned, detecting members for thereby indicating the position of impingement of light thereon.

The photoactive body of material 13 is advantageously a crystal of bismuth germanium oxide and is hereinafter simply called "crystal 13." However, as the photoactive phenomenon is presently understood, the crystal 13 can be any body of material which is capable of exhibiting to a significant degree photoconductivity and which has an optically active characteristic. Semiconductors exhibit photoconductivity. One group of materials displaying both characteristics, and including bismuth germanium oxide, is the group of crystals characterized as the cubic point group 23.

The crystal 13 illustrated in FIG. 1 advantageously has a thickness (in the direction of transmission of the light beam 11) of about 4 millimeters, a height in the vertical direction in the drawing of about 1.5 millimeters, and a depth as illustrated in the drawing of about 2 millimeters. The exact dimensions producing optimum results will differ for particular wavelengths of beam 11, but the dimensions are not critical to the production of the indicated photoactivity results. The crystal 13 is oriented so that its $\overline{1}10$ direction is parallel to the direction of transmission of the light beam 11. Either the 110 or the 001 direction of the crystal is oriented to be parallel to the vertical direction of the crystal 13 as shown in FIG. 1. This latter direction is also the direction of application of a biasing electric field which is applied across crystal 13 from a bias signal source 18.

Bismuth oxide and germanium oxide are both available commercially. The crystal 13 is advantageously produced by the synthesizing technique described in the article "The Growth and Properties of Piezoelectric Bismuth Germanium Oxide, $Bi_{12}GeO_{20}$" by A. A. Ballman, published at p. 37 in the January 1967 issue of the International Journal for Crystal Growth, North-Holland Publishing Company, Amsterdam, Netherlands. The technique is also set forth, in terms of gamma bismuth trioxide, in the copending U.S. application of A. A. Ballman, Ser. No. 522,840, filed Jan. 25, 1966.

Figure 4:
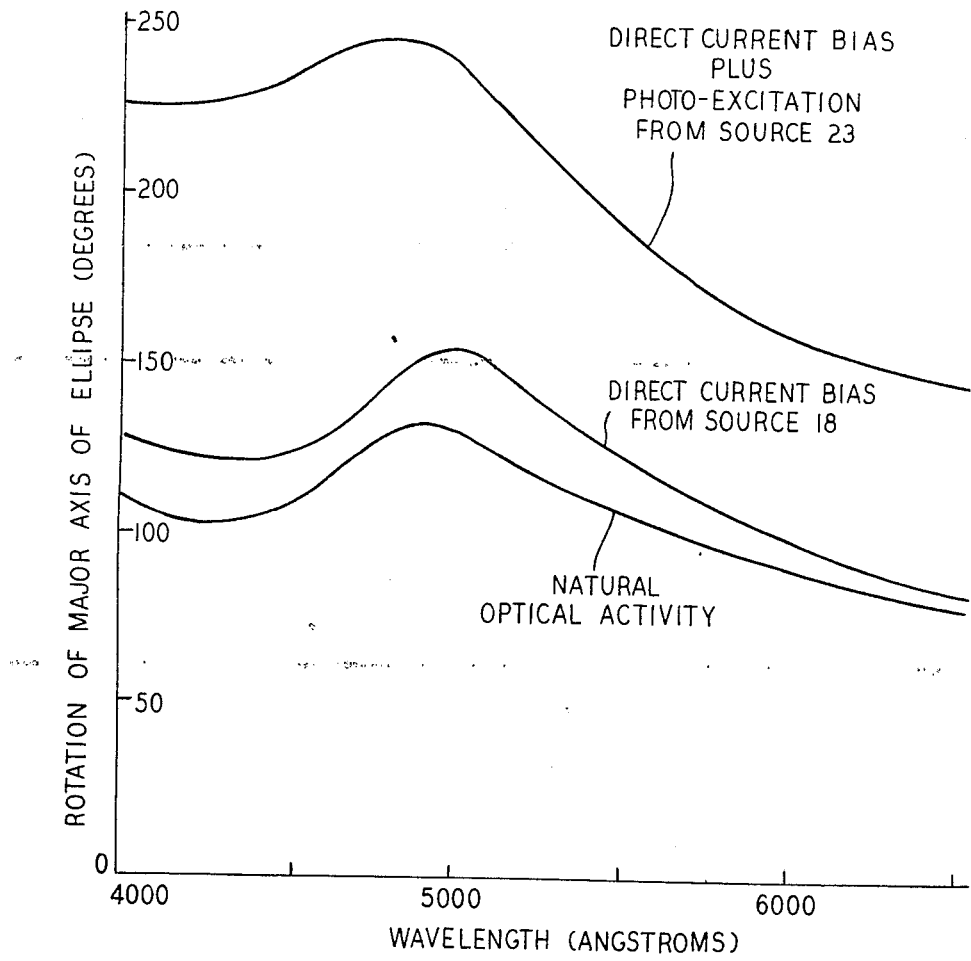
FIG. 4 is a set of curves of optical activity under different conditions.

The source 10 in FIG. 1 is preferably a helium-neon laser radiating photon energy of wavelength 6328 A. The intensity of beam 11 is not critical. The bismuth germanium oxide crystal 13 has an absorption band which is primarily responsive to wavelengths in the range of 4000 A. to 6000 A. The laser output wavelength is outside the absorption band of crystal 13 and in the indicated embodiment the output is at a frequency below the band. The radiation from the source 10 does not generate a significant number of charge carriers, regardless of the intensity of the output beam 11, in the sense that the intensity of beam 11 does not significantly affect light transmission characteristics of crystal 13. The diameter of the beam produced by source 10 is approximately one millimeter so that the diameter is much smaller than the area of crystal 13 upon which the beam is projected. The beam diameter is schematically indicated in FIG. 1 by the circle 11″ on detector 17. The limiting factor on the beam diameter is that a significant unradiated boundary region must remain between the edge of the beam and electrodes 19 and 20 which couple source 18 to the crystal. A significant boundary region would be, for example, one-half of the beam diameter. The natural optical activity characteristic of crystal 13 rotates the plane of polarization of beam 11. The total rotation through a crystal is a function of the crystal thickness in the direction of transmission of beam 11 under any given set of conditions. A further significant rotation results under the stimulus of both an appropriate bias field and an appropriate side light as will be discussed. The increased rotation is illustrated in FIG. 4 with respect to natural optical activity and such activity slightly enhanced by only a bias voltage.

In one embodiment of the invention polarizer 12 and analyzer 16 are set for minimum beam intensity at detector 17. Although the polarizer and analyzer are shown rotated to 90 degrees with respect to one another in FIG. 1, they would actually have any necessary relative orientation to provide a desired level of illumination at the detector 17 for the portion of the system described so far. Thus, any desired reference intensity from maximum intensity through minimum intensity can be used, depending upon the particular application desired for the illustrated system.

Bias from source 18 is applied to crystal 13 through contacts 19 and 20 to stimulate the electro-optic characteristic of the crystal. The contacts are advantageously an indium-mercury amalgam, as known in the art, to be certain of ohmic contact to the crystal. The bias supplied by source 18 is typically of the order of 2500 volts applied across the 1.5 millimeter dimension for the system as described thus far. Bias voltages larger than 2500 volts can be employed up to levels limited by the strength of the crystal. These larger bias voltages, approaching two orders of magnitude larger than the indicated 2500 volts, can be realized with a crystal in a vacuum or with a crystal in an atmosphere of high pressure inert gas. On the other hand, the bias voltage can be significantly reduced, e.g., to the order of 50 to 60 volts, while still realizing the same effects to be hereinafter described, by employing ferroelectric enhancement as will be subsequently discussed.

Returning now to FIG. 1, a second light source 23 is arranged for controllably illuminating at least one portion of the crystal 13 to modify the stimulation of crystal optical activity. The beam 26 must illuminate a portion through which the probing light beam is transmitted, but the beam 26 advantageously illuminates the entire crystal to produce a larger output signal rotation. The output of source 23 is thus applied as a beam 26 schematically represented by the broken-line arrow. Source 23 is advantageously a source of multichromatic light such as might be provided by an ordinary low intensity hand flashlight or microscope light. In a broader sense, the invention has been operated by simply using for the light source 23 the ordinary artificial illumination of a room in which the other structures of FIG. 1 are arrayed. The intensity of the illumination of source 23 is advantageously adjustable, as schematically indicated by the adjustable resistor 27 which is connected to source 23. The most efficient side light is one with a wavelength at the peak of the absorption band of the crystal. It is essential that some energy in the absorption band be provided, and a multichromatic source is the most convenient source for such light.

Illumination from source 23 modifies the stimulation of the optical activity characteristic of crystal 13, thereby producing an apparent rotation of the plane of vibration of the plane-polarized beam 11 from polarizer 12. Since polarizer 12 and analyzer 16 have a fixed predetermined rotational orientation, the illumination from source 23 which rotates the plane of vibration of beam 11 also disturbs the initial fixed level of illumination at detector 17, e.g., the initially mentioned illumination intensity minimum. Selectable variations in the intensty of llumination from source 23 correspondingly change the extent of rotation of the plane of vibration caused by the crystal 13, but such intensity variations are advantageously limited in order to limit rotation to 90 degrees to avoid an ambiguity in the results at detector 17. Similarly, variations in the magnitude of the bias field supplied by source 18, with the intensity of illumination from source 23 fixed, also change the rotational effect of crystal 13 and consequently the intensity of illumination at detector 17. Likewise, dual modulation can be achieved by varying both the illumination intensity provided by source 23 and the electric field intensity provided by source 18. However, variations in the intensity of light emitted by source 10 do not significantly affect the plane of polarization of such light as it is transmitted through the polarizer 12, crystal 13, and analyzer 16 to the detector 17.

FIG. 4 illustrates the enhanced rotation realized in crystal 13 by use of side light from source 23. The presence of the electric field in crystal 13 causes some linear birefringence that results in some elliptical polarization in the beam 11 emerging from crystal 13. The orientation of the major axis of the ellipse is used in FIG. 4 to define the extent of rotation in the plane of vibration of beam 11. The elliptical polarization is insufficient to require compensation in the illustrated embodiments, but compensation techniques are known in the art if compensation is desired for some applications.

Figure 1A:
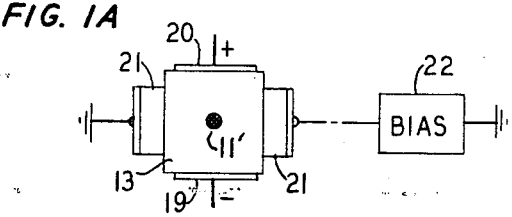
FIG. 1A is a partial diagram illustrating a modified form of the system of FIG. 1.

It was previously noted that the electric bias field voltage can be significantly reduced by employing ferroelectric enhancement. FIG. 1A illustrates in simplified form one way to achieve such enhancement. Ferroelectric crystals such as the crystals 21 of barium titanate shown in FIG. 1A on either side of crystal 13 are used for enhancement. Each of the crystals 21 is poled to one of its two relatively stable charge states by a voltage appropriate to its thickness. In the illustrated embodiment each crystal of about one millimeter thickness, and a voltage in the range of approximately 10 to 20 volts from the output of a bias voltage source 22, is required to establish the desired states of crystal 21. Such voltage is applied across the series combination of crystals 21 and crystal 13 as shown in FIG. 1A. The ferroelectric crystals 21 are arranged in contact with opposite edges of crystal 13, which edges correspond to the front and back edges of the crystal shown in FIG. 1. Ohmic contacts of the same type as contacts 19 and 20 are utilized to make electrical contacts to crystals 21 but no such contacts are employed between crystals 21 and crystal 13. The circular, crosshatched portion 11' of crystal 13 in FIG. 1A represents the cross section of the light beam 11 in FIG. 1. Regardless of the charge polarity on crystals 21, the crystals extend parallel to the direction of the electric field otherwise imposed on crystal 13 by source 18. Crystals 21 also extend along a portion of the edge of crystal 13, and the size of that portion depends upon other circuit parameters such as the magnitude of bias provided by source 22 and the gradient to be established in crystal 13.

The ferroelectric enhancement effect has also been produced by poling a single ferroelectric crystal in a separate circuit and manually placing that crystal in contact with one edge of crystal 11 parallel to the electric field. It has been found that the enhancement effect with a single crystal is strongest when the barium titanate crystal surface that is positively charged is in contact with the bismuth germanium oxide crystal 13.

Figure 2:
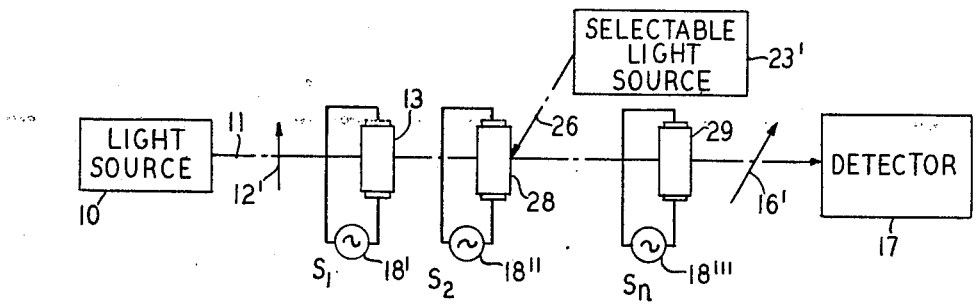
FIG. 2 is a simplified drawing of an extension of the system of FIG. 1 to a signal selecting system.

Illustrated in FIG. 2 is a signal selecting system which is an extension of the light modifying arrangement of FIG. 1. In FIG. 2, system elements which are the same as or similar to corresponding elements in FIG. 1 are indicated by the same or similar reference characters. Thus, the polarizer and analyzer are schematically represented by differently oriented arrows for illustrating in simplified form the different transmission axis orientations of such elements in FIG. 2. The crystal 13 in FIG. 2 is subjected to a variable electric field supplied from a source 18' which is otherwise designated in the drawing as source $S_1$.

Additional crystals 28 and 29 in FIG. 2 are of the same type as the crystal 13 and are similarly subjected to respective variable electric fields from sources 18" and 18''', which are further designated sources $S_2$ and $S_n$ respectively, to indicate that additional crystal and source combinations can be similarly employed in the system of FIG. 2. All of the crystals 13, 28, and 29 are disposed in light-transmitting tandem arrangement with respect to the light beam 11 in FIG. 2. The sources $S_1$ through $S_n$ provide different signals to their respective crystals, and in one embodiment they are advantageously supplying signal waves of different frequencies to be selected in a manner which will be described.

The source 23' in FIG. 2 supplies multichromatic light of variable intensity as did the source 23 in FIG. 1. The source 23' has the further capability, however, of illuminating selected ones of the crystals 13, 28, or 29, either by sweeping the light beam 26 from one crystal to another or by activating selected separate unit sources for each of the crystals. However, the beam 26 must strike a portion of any particular crystal through which the beam 11 is transmitted. In the particular embodiment of FIG. 2 the polarizer 12' and analyzer 16' are advantageously arranged so that the source 10 supplies either maximum or minimum illumination to detector 17 in the absence of a side light from source 23' on any of the crystals through which the beam 11 is transmitted. In the no-side-light condition, variable intensity signals from the sources $S_1$ through $S_n$ are ineffective for rotating the polarization of beam 11. However, as soon as the side light beam 26 strikes one of the crystals as previously described, e.g., crystal 28 as illustrated in FIG. 2, the bias signal source 18" coupled to that crystal rotates the plane of vibration of beam 11 by amounts corresponding to the amplitudes of signal from source 18". This variable rotation results in a corresponding variation in the intensity of the beam 11 at detector 17. This source 23' can cause the modulation of beam 11 by any selectable one, or more, of the sources $S_1$ through $S_n$.

Figure 3:
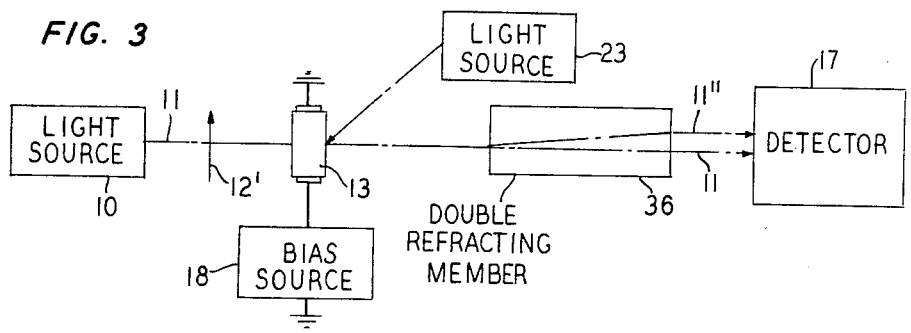
FIG. 3 is a simplified drawing of a light deflecting system employing the present invention.

In FIG. 3 there is shown a light beam deflecting system utilizing the present invention. Here again system elements corresponding to those employed in FIG. 1 are designated by the same or similar reference characters. In FIG. 3 the analyzer 16 is replaced by a double refracting member 36. Such members are known in the art, an example is a calcite rod, e.g., a clear calcite cleavage rhomb. The calcite rod is oriented so that its ordinary ray version of the beam 11 is applied to one portion of the detector 17 and its extraordinary ray version of the beam 11" is applied to a different portion of the detector 17 as shown in FIG. 3. This type of displacement is produced by illuminating crystal 13 with multichromatic light from the source 23 for rotating the plane of vibration of beam 11 as it passes through crystal 13 and thereby activating the different refractive effects of the device 36. Similarly, if a Wollaston prism is employed it would be oriented so that the interface between its two joined portions thereof lies in a plane perpendicular to the plane of the drawing of FIG. 3 and oriented at approximately 45 degrees with respect to the beam 11. Here again illumination of crystal 13 by source 23 rotates the plane of vibration of beam 11 for causing the Wollaston prism to displace the beam laterally from one position to another on detector 17.

Although the present invention has been described in connection with particular embodiments thereof, it is to be understood that other embodiments and modifications which will be obvious to those skilled in the art are included within the spirit and scope of the invention.

What is claimed is:

1. In combination,
a body of material,
means applying, for tranmission along a first axis through said material, a probing beam of plane-polarized electromagnetic wave energy,
means applying across said body, along a second axis through said material, an electric field, and
means selectably illuminating at least a portion of said body in time coincidence with application of said field and said beam for alternating the transmission characteristics of said body for said beam.

2. The combination in accordance with claim 1 in which
the wavelength of said energy in said beam is outside the absorption band of said body.

3. In combination,
a member having a natural optical activity characteristic
means stimulating said optical activity characteristic, and
means modifying optical activity stimulated by said stimulating means.

4. The combination in accordance with claim 3 in which said member also has a photoconductive characteristic.

5. The combination in accordance with claim 3 in which
said member also has an electro-optic characteristic.

6. The combination in accordance with claim 3 in which
said member is in the cubic point group 23.

7. The combination in accordance with claim 3 in which
said member is a semiconductor material.

8. The combination in accordance with claim 3 in which
said member is bismuth germanium oxide.

9. The combination in accordance with claim 5 in which
means apply a bias voltage across said member.

10. The combination in accordance with claim 9 in which
a poled ferroelectric member is positioned adjacent to said semiconductor member along a direction parallel to the axis of application of said bias voltage across said member.

11. The combination in accordance with claim 3 in which
said means stimulating said optical activity characteristic is a beam of monochromatic light having a wavelength outside the range of wavelengths within the principal part of the absorption band of said material and of insufficient intensity to generate significant numbers of charge carriers in said member.

12. The combination in accordance with claim 11 in which
said member is crystalline,
said beam is oriented parallel to the $\overline{1}10$ crystalline direction of said material, and
means apply a bias voltage across said member in the 110 direction thereof.

13. The combination in accordance with claim 11 in which
said member is crystalline,
said beam is oriented parallel to the $\overline{1}10$ crystalline direction of said material, and
means apply a bias voltage across said member in the 001 direction thereof.

14. The combination in accordance with claim 3 in which,
said means modifying the activity is a multichromatic light also illuminating at least a portion of said member and of at least sufficient intensity to generate charge carriers throughout the region so illuminated.

15. The combination in accordance with claim 11 in which,
said means modifying the activity is a multichromatic light also illuminating at least a portion of said member and of at least sufficient intensity to generate hole and electron pairs throughout the region so illuminated, which region includes portions of said member affected by said monochromatic light.

16. The combination in accordance with claim 15 in which,
means apply a bias voltage to said crystal with the axis of the electric field produced thereby being perpendicular to the axis of said monochromatic light beam.

17. The combination in accordance with claim 15 in which,
said monochromatic light beam is radiated from a source of illumination,
light detecting means are arranged on the opposite side of said member from said light source and in a position to receive said beam after transmission through said member,
an electromagnetic wave polarizer is between said source and said member, and
an electromagnetic wave analyzer is between said member and said detector and having a predetermined orientation of its plane of vibration for transmission with respect to a plane of vibration for transmission of said polarizer.

18. The combination in accordance with claim 15 which comprises in addition,
means altering the intensity of said multichromatic light for thereby changing the intensity of said monochromatic light at said detector.

19. The combination in accordance with claim 9 in which,
said bias voltage applying means is a source of time-variable-amplitude electric signals for modifying the effect of said electro-optic characteristic.

20. The combination in accordance with claim 15 which comprises in addition,
at least one additional member of the same type as the first-mentioned member and disposed in tandem light-transmitting arrangement with respect to said beam and said first-mentioned member,
each of said additional members having coupled thereto a separate electric signal source for applying to such member a bias signal along an axis perpendicular to the axis of said beam, and
said multichromatic light includes means directing radiation therefrom on at least a selected one of said members.

21. The combination in accordance with claim 17 in which,
said analyzer comprises double refraction means,
means adjust the intensity of said multichromatic light for thereby shifting the position of impingement of said beam upon said detector.

22. The combination in accordance with claim 21 in which,
said double refraction means is a calcite rod oriented to direct ordinary and extraordinary rays of said beam to different portions of said detector.

23. In combination,
an electro-optic semiconductor member having optical activity characteristics,
means applying electric signals across said member in a first direction,
means applying a monochromatic polarized light beam for transmission through said member in a second direction, and
means illuminating said member with light including at least energy in the absorption band of said member for at least partially controlling the light transmission characteristics of said member as a function of the intensity of illumination.

References Cited

UNITED STATES PATENTS

| | | | |
|---|---|---|---|
| 2,706,792 | 4/1955 | Jacobs | 250—83.3 |
| 2,811,898 | 11/1957 | West | 350—150 |
| 3,050,684 | 8/1962 | Sclar | 331—107 X |
| 3,272,988 | 9/1966 | Bloom et al. | 250—225 X |

JAMES W. LAWRENCE, Primary Examiner

DAVID O'REILLY, Assistant Examiner

U.S. Cl. X.R.
250—199; 350—150

Disclaimer 3,492,492.—*Albert A. Ballman*, Woodbridge, *Pascal V. Lenzo*, Warren Township, Somerset County, and *Edward G. Spencer*, Berkeley Heights, N.J. OPTICALLY ACTIVE DEVICE WITH OPTICAL ENHANCEMENT. Patent dated Jan. 27 1970. Disclaimer filed July 10 1970, by the assignee, *Bell Telephone Laboratories, Incorporated.*

Hereby enters this disclaimer to claim 3 of said patent.

[*Official Gazette November 10, 1970.*]